United States Patent
O'Dell et al.

[11] Patent Number: 5,266,384
[45] Date of Patent: Nov. 30, 1993

[54] AESTHETIC SURFACE LAYER

[75] Inventors: Robin D. O'Dell; Joseph Lex, both of Pasadena, Md.

[73] Assignee: Nevamar Corporation, Odenton, Md.

[21] Appl. No.: 731,981

[22] Filed: Jul. 18, 1991

[51] Int. Cl.$^5$ .......................... B32B 3/10; B32B 27/42
[52] U.S. Cl. .................................. 428/207; 428/208; 428/325; 428/327; 428/328; 428/331; 428/341; 428/414; 428/340
[58] Field of Search .............. 428/325, 327, 328, 331, 428/341, 414, 207, 208, 340

[56] References Cited

U.S. PATENT DOCUMENTS

| | | | |
|---|---|---|---|
| Re. 30,233 | 3/1980 | Lane et al. | 428/207 |
| Re. 31,373 | 9/1983 | Ungar et al. | 156/222 |
| Re. 32,152 | 5/1986 | Scher et al. | 428/148 |
| 2,936,814 | 5/1960 | Yakubik | 154/26 |
| 3,235,643 | 6/1964 | Michl | 161/79 |
| 3,540,978 | 11/1970 | Ames | 161/162 |
| 3,661,673 | 5/1972 | Merriam | 156/279 |
| 3,968,291 | 7/1976 | Chevallier | 428/403 |
| 4,044,185 | 8/1977 | McCaskey, Jr. et al. | 428/153 |
| 4,109,043 | 8/1978 | DeLapp | 428/206 |
| 4,112,169 | 9/1978 | Huffman et al. | 428/206 |
| 4,255,480 | 3/1981 | Scher et al. | 428/208 |
| 4,311,757 | 1/1982 | Raghava et al. | 428/323 |
| 4,322,468 | 3/1982 | Raghava | 428/204 |
| 4,374,886 | 2/1983 | Raghava | 428/172 |
| 4,473,613 | 9/1984 | Jaisle et al. | 428/220 |
| 4,499,137 | 2/1985 | O'Dell et al. | 428/211 |
| 4,532,170 | 7/1985 | O'Dell et al. | 428/143 |
| 4,567,087 | 1/1986 | O'Dell et al. | 428/211 |
| 4,713,138 | 12/1987 | Ungar et al. | 156/307.4 |
| 4,713,299 | 12/1987 | Taylor | 428/526 |

Primary Examiner—P. C. Sluby
Attorney, Agent, or Firm—Jones, Day, Reavis & Pogue

[57] ABSTRACT

A decorative laminate surface layer composition is prepared by selectively applying dissimilar thermoset or thermoplastic polymers that are compatible with a laminate resin system to a decorative laminate facing sheet.

10 Claims, 2 Drawing Sheets

AESTHETIC SURFACE LAYER

FIELD OF THE INVENTION

The present invention relates to decorate the laminates having a two layer surface coating of dissimilar laminate resins and to processes for producing such laminates. The laminates are suitable for counter tops, wall panels, floor surfacing, tabletops and the like.

BACKGROUND

Decorative laminates have been conventionally made by stacking a plurality of layers of paper impregnated with thermosetting resins. Normally, the assembly consists of a plurality (for example, three to eight) of core sheets made from phenolic resin impregnated kraft paper, above which lies a decor sheet impregnated with melamine resin. An overlay sheet is provided on top of the decor sheet which, in the laminate, is essentially transparent and provides protection for the decor sheet.

Improvements of this process are disclosed in Scher et. al. U.S. Pat. Nos. 4,255,480; 4,263,081; 4,327,141; 4,395,452; 4,400,423; U.S. Re. No. 32,152; Ungar et. al. U.S. Pat. Nos. 4,713,138; and O'Dell et al. 4,567,087. These patents are commonly assigned herewith and their disclosures are incorporated by reference herein.

Scher et. al. U.S. Re. No. 32,152 teaches that compositions containing small mineral particles, which when coated without resin over unimpregnated printed paper, provide surprising and unexpected properties permitting such paper to be used in the preparation of decorative laminates without an overlay sheet. The resultant laminates are highly abrasion resistant.

This Scher coating composition is composed of a mixture of small particles of alumina or other abrasion resistant particles of average 20–50 micron particle size, and a lesser amount of micro-crystalline cellulose particles, both dispersed in a stable, aqueous slurry. The particles of alumina, of small size such that they do not interfere with the visual effects in the final product, serve as the abrasion resistant material and the micro-crystalline cellulose particles serve as the preferred temporary binder. Scher further teaches that the binder must be compatible with the resin system late utilized in the laminating procedure, usually melamine resin or in the case of certain low-pressure laminates a polyester resin system, and the micro-crystalline cellulose serves this function as well as stabilizing the small particles of alumina of the surface of the print sheet.

Ungar et. al. U.S. Pat. No. 4,713,138 teaches the process of depositing onto the surface of a decor sheet an ultra-thin layer of abrasion resistant material, which material is substantially disclosed in U.S. Pat. No. 4,255,480, simultaneously with the complete resin saturation of the decor sheet in a single step operation. The resin composition of the Ungar process acts as the carrier for the abrasion resistant material. The abrasion resistant composition consists essentially of an abrasion resistant hard mineral of fine particle size, preferably about 20–50 microns, in quantities sufficient to provide an abrasion resistant layer without interfering with visibility. The abrasion resistant mineral in Ungar is preferably alumina, silica or a mixture thereof. Ungar further teaches the use of a binder material for such mineral. The binder material in Ungar is present in an amount sufficient to bind the abrasion resistant mineral to the surface of the decor sheet. Such binder material is preferably a mixture of micro-crystalline cellulose with a minor amount carboxy methyl cellulose.

One such binder sold by FMC Corporation under the trademark "AVICEL" is a mixture of approximately 89% micro-crystalline cellulose and 11% carboxy methyl cellulose. The abrasion resistant composition suitably contains 1–8 parts by weight of "Avicel" to 4–32 parts by weight of mineral particles preferably at a ratio of mineral particles to binder material of 4:1 to 1:2, and a quantity of 1 part of "AVICEL" per 2 parts of mineral particles has been found to be particularly suitable.

Ungar et. al. also teaches that small additional quantities of carboxy methyl cellulose and a small quantity of silane may be added to the composition. Also, it is preferable to include a small quantity of surfactant, as disclosed in U.S. Pat. No. 4,255,480, and a small quantity of solid lubricant to provide scuff resistance, as disclosed in U.S. Pat. No. 4,567,087 in those compositions.

Accordingly, the above discussed patents provide single and two stage processes for providing a thin or ultra thin abrasion resistant laminate surface applied to decor sheets. However, it has been a continuing problem in the industry to provide a chemical, stain and abrasion resistant laminate surface on a decor sheet suitable for horizontal surfaces having certain brilliant visual appearance such as a pearlescent effect.

While considerable activity in the field has led to many decorative surface appearances, these activities resulted in the development of processes and compositions wherein the resin material was impregnated into the structure of the paper and the thin or ultra-thin layers of the laminate resin on the surface. The prior processes have failed to achieve laminate which meet all the international standards for horizontal laminate surfaces while retaining brilliant visual effects.

SUMMARY OF THE INVENTION

It is an object of this invention to provide products and methods for producing products which overcome the above mentioned problem encountered in this field.

It is a particular object to provide a laminate surface layer composition including a two layer coating of at least two dissimilar resin polymers to achieve desirable wearability, chemical, thermal, ultra-violet radiation resistance, and abrasion resistance, while achieving a brilliant visual decorative appearance of the laminate surface layer. This brilliant visual appearance is remarkable for its rich depth of color and luster.

A further object of the present invention is to obtain a true pearlescent appearance in a laminate. The results of this invention are very surprising as the resins used in this invention have long been known in the laminates field. However, never before has a pearlescent finish been achieved that is suitable for horizontal surfaces. In addition to providing these products, it is yet another object of this invention to provide processes for achieving these laminates.

These and other objects of the invention are achieved by applying a surface coating of a liquid or particulate resin onto a conventional decorative facing sheet or paper, (including, prints, solids, foils, etc.). The surface coating resin may be applied as a liquid dispersion of multiple dissimilar polymers, such as a colloid, as a mixture of polymer particles suspended in a liquid resin, such as an emulsion, or as aqueous dispersion of polymer particles in water. Exemplary of suitable polymer particles for use herein are polyester, polyurethane, polyvinyl chloride, epoxy, and acrylic, or mixtures thereof. For purposes of this invention the term "particles" or "particulates" is not limited to those materials which are solid at room temperatures.

DETAILED DESCRIPTION OF EMBODIMENTS

Figure 1:
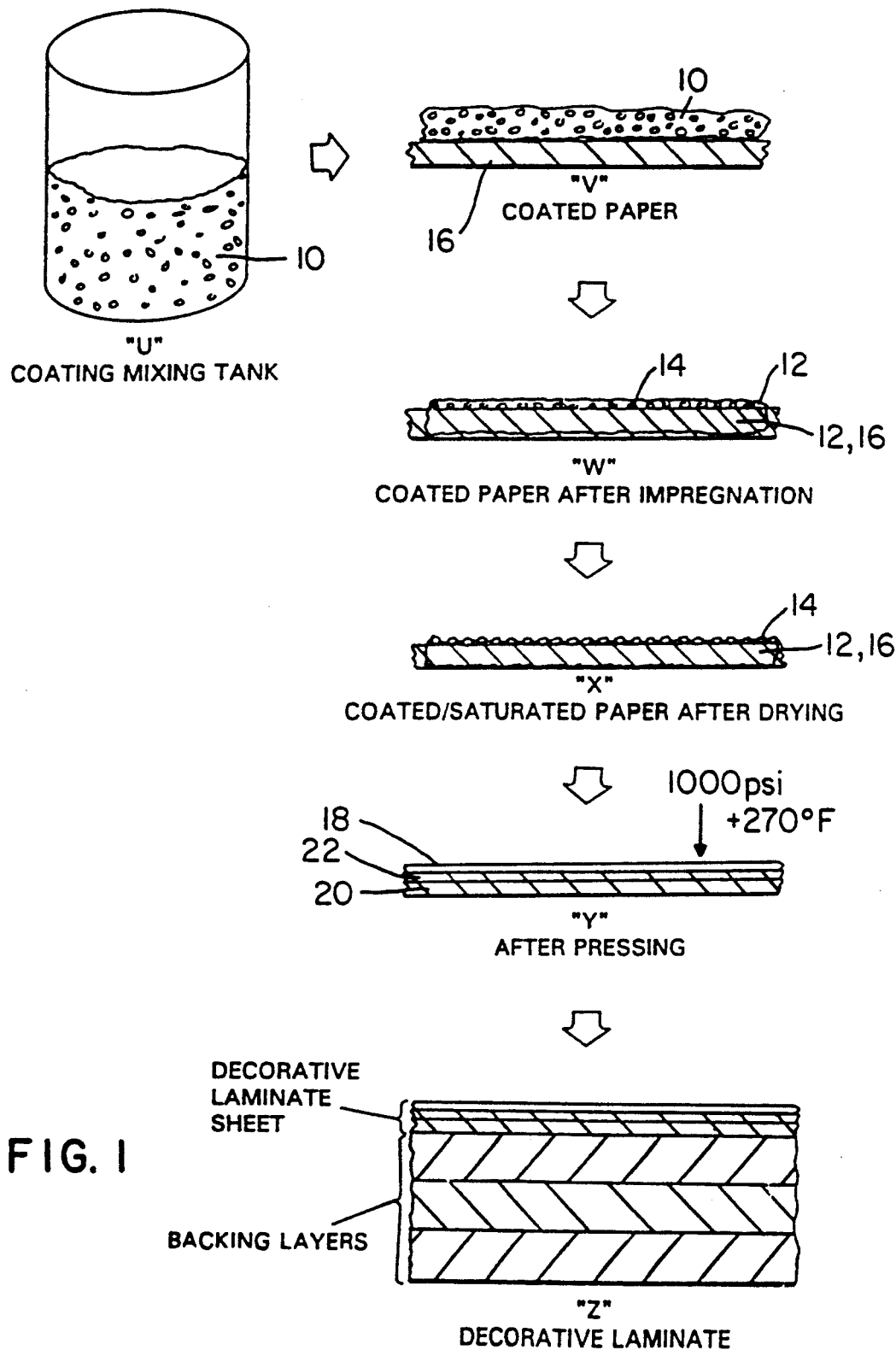
FIG. 1 is a flow chart showing the one step method to achieve the present invention using schematic sectional views of the decorative paper and laminate in accordance with the present invention.

With reference to FIG. 1, the one step process is seen. The coating mix tank (U) contains a dispersion of at least two dissimilar resins (10)—an impregnating resin (12) and a coating resin (14), which will melt and flow under heat and pressure. Coating resin (14) can be a solid particulate or liquid globules insoluble in and dispersed within impregnating resin (12). The dispersion (10) is then coated onto the decorative facing paper (16) as illustrated by coated paper (V). Impregnating resin (12) soaks into and impregnates facing paper (16) which causes the coating resin (14) to be filtered out onto the exterior surface of the facing paper (16). The coated paper after impregnation (W) is than dried in the usual manner resulting in coated paper (X). Dried coated paper (X) which has become impregnated with impregnating resin (12) has a surface coating of coating resin (14). The dried coated and impregnated paper (X) is than subjected to the usual laminating conditions to form the decorative laminate sheet (Y) which has substantially two surface layers. These two resin layers include a surface layer (18) consisting essentially of coating resin (14) and a second layer (20) consisting of impregnating resin (12) which is contained almost entirely within the paper. There is a small interface portion (22) within the paper with contains both resins (12) and (14). The decorative laminate sheet (Y) is then laminated under heat and pressure to the backing layer to produce the decorative laminate (Z).

Figure 2:
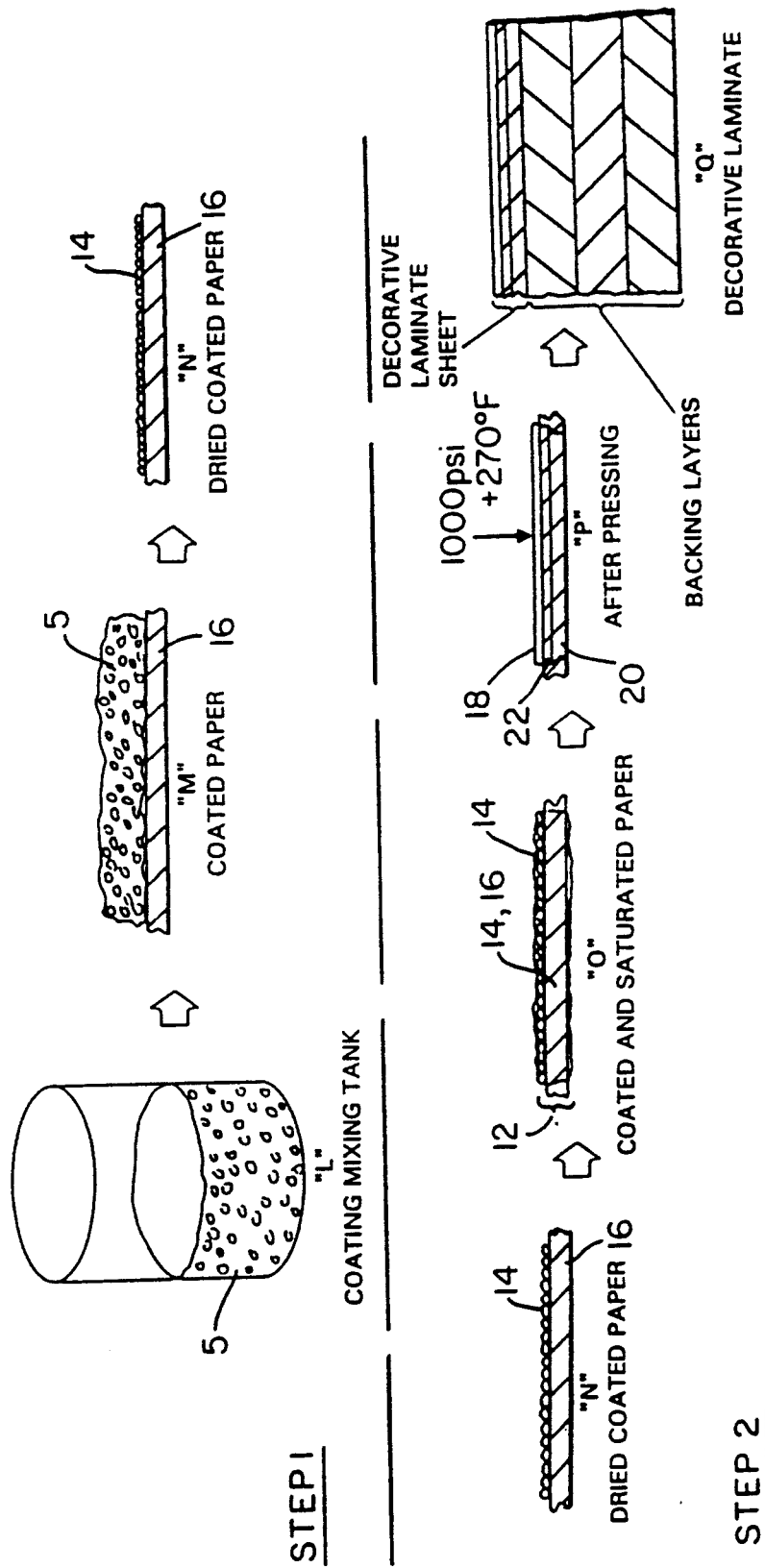
FIG. 2 is a flow chart showing the two step method to achieve the present invention using schematic sectional views of the decorative paper and laminate in accordance with the present invention.

With reference to FIG. 2, the two step process is seen. The coating mixing tank (L) contains a dispersion (5) of an aqueous mixture and coating resin (14), which will melt and flow under heat and pressure. Coating resin (14) can be a solid particulate or liquid globules insoluble in and dispersed within the aqueous mixture. The dispersion (5) is then coated onto the decorative facing paper (16) as illustrated by coated paper (M). The facing paper (16) is then dried in the usual manner to produce dried coated paper (N). Dried coated paper (N) is then coated, saturated and impregnated with impregnating resin (12) to form saturated paper (O) where upon the impregnated facing sheet is then subjected to normal laminating conditions to produce the decorate laminate sheet (P) which has substantially two surface layers. These two resin layers include a surface layer (18) consisting essentially of coating resin (14) which has substantially displaced impregnating resin (12) on the surface. A second layer (20) consists of impregnating resin (12) which is contained almost entirely within the paper. There is a small interface portion (22) within the paper with contains both resins (12) and (14). The decorative laminate sheet (P) is then laminated under heat and pressure to the backing layer to produce the decorative laminate (Q).

DESCRIPTION OF THE INVENTION INCLUDING PREFERRED EMBODIMENTS

The product produced in accordance with this invention includes a decorative facing sheet laminated onto the exterior surface of a backing layer and a coating layer that is an integral part of the laminate on the exterior surface of the facing sheet to form an outer surface thereon.

The exterior coating layer is made from a resin which is dissimilar from the laminate impregnating resin. To achieve a pearlescent appearance, the exterior coating layer should have a refractive index in the finished cured laminate dissimilar from the refractive index of the ink on the decorative facing sheet.

Such exterior coating may optionally contain a mixture of an abrasion resistant mineral and a stabilizing suspending agent or binder material for said mineral. The abrasion resistant mineral has a particle size of between 1-200 microns and is present in the mixture in a concentration sufficient to provide abrasion resistance without interfering with visibility.

In a preferred form, the coating composition of this invention includes a dispersion mixture of small particles of alumina or other abrasion resistant particles of between about 1-200 micron particle size, polymer particulates of between sub-micron and 250 micron particle size and a lesser amount of micro-crystalline cellulose particles, all dispersed in a stable, aqueous slurry. To achieve a pearlescent appearance, the polymer particulates have a refractive index in the finished cured laminate dissimilar to the refractive index of the pearlescent ink on the decorative facing sheet. When using the polymer particulate coating dispersion, the particulates are present in the dispersion such that they melt and flow at the elevated temperatures and pressures of the laminating process.

The particles of alumina are of a small size such that they do not interfere with the visual effects in the final product and serve as the abrasion resistant material. The micro-crystalline cellulose particles serve as the preferred temporary binder material or suspending agent. It will be understood that the binder material or suspending agent must be compatible with the resin system later utilized in the laminating procedure, usually melamine resin, or in the case of certain low-pressure laminates, a polyester resin system. The micro-crystalline cellulose serves this function as well as stabilizing the small particles of alumina of the surface of the print sheet.

The preferred slurry composition contains a mixture of small particles of alumina and the polymer particulates and a lesser amount of micro-crystalline cellulose particles, all dispersed in water. There must be an amount sufficient of the binder material or suspending agent to retain the mineral particles and polymer particulates in place on the surface of the decor facing sheet. In general, it has been found that satisfactory results are attained with about 5 to 10 parts by weight of the micro-crystalline cellulose for about 20-120 parts by weight of the alumina and polymer particulate. However, it is possible to work outside this range. The quantity of water in the slurry is also dictated by practical considerations, since if there is too little water, the slurry becomes so thick that it is hard to apply. Similarly, if there is too much water, the slurry becomes so thin that it is difficult to maintain a consistent thickness during the coating operation due to running of the slurry. Thus, a slurry containing about 2.0 wt % micro-crystalline cellulose and about 24 wt % alumina and polymer particulates, based on the water, is stable, i.e., the alumina does not settle out; but if more than about 3.5 wt % micro-crystalline cellulose and about 24 wt % alumina and polymer particulates, based on the water, is used, the slurry becomes very thixotropic and difficult to apply.

The composition also preferably contains a small amount of wetting agent, preferably a non-ionic wetting agent, and a silane. The quantity of wetting agent is not critical, but only a very small amount is desirable and excess quantities provide no advantage. If a silane is used, it acts as a coupling agent which chemically binds the alumina or other inorganic particles to the melamine matrix after impregnation and cure. This provides better initial wear since the alumina particles are chemically bound to the melamine in addition to being mechanically bound thereto and therefore stay in place longer under abrasive wear. The particular silane used should be selected from among the group making it compatible with the particular laminating resin used. (See the 1976-77 Edition of Modern Plastics Encyclopedia, Page 160, which lists some silanes useful with melamine and polyester systems.) In this regard, silanes having an amino group, such as gamma-aminopropyl-trimethoxy silane, are particularly effective for use with melamine resins.

The quantity of silane used need not be great and, in fact, as little as 0.5% based on the weight of the alumina is effective to enhance the abrasion resistance of the final laminate. A maximum quantity of about 2% by weight based on the weight of the alumina or other particles is suggested since greater quantities do not lead to any significantly better results and merely increase the cost of the raw materials. The decorative paper is then impregnated in the normal manner with a suitable laminating resin, usually a thermosetting resin.

The polymer particulates can be selected from any of the traditional laminating resins. Enhanced wearability, chemical, thermal, ultra-violet radiation resistance, and abrasion resistance is possible by selecting the appropriate coating resin for a specific property. For instance, a vinyl-ester may be selected if a high resistance to mineral acids and mineral basis is desired. An acrylic may be selected for ultra-violet radiation stability. An epoxy may be selected if thermal resistance is desired and a for a high chemical and stain resistance. In order to achieve the brilliant visual pearlescent effect, it is important to select a resin having a refractive index in the finished cured laminate dissimilar from the refractive index of the pearlescent ink in the decorative laminate paper being used. The selection of polymer particulates is preferably made from the group consisting of polyester, polyurethane, epoxy, polyvinyl chloride and acrylic, or mixtures thereof. In addition to alumina, mineral particles may include silica, zirconium oxide, cerium oxide, glass beads and diamond dust or mixtures thereof.

Another preferred method for achieving the objects of this invention is by the process of depositing on the surface of a decor sheet a dispersion of liquid dissimilar resins or layer of polymer particulates simultaneously with the complete resin saturation of the decor sheet in a single step operation, in which the resin may optionally act as a carrier for the abrasion resistant material.

This process by which the present invention is achieved is best described as follows:

(a) preparing a coating dispersion of at least two dissimilar resins, wherein the first of said dissimilar resins is an impregnating resin and wherein the second of said dissimilar resin is the surface coating resin which melts and flows under heat and pressure, and a binder material which is compatible with said impregnating resin and which will withstand subsequent laminating conditions;

(b) coating and impregnating in at least one step by coating said coating dispersion over the exterior facing surface of an unsaturated decorative facing sheet at a rate such that said unsaturated paper becomes substantially saturated with said impregnating resin, and the second dissimilar resin is filtered onto said facing surface; and (c) drying said coated and impregnated decorative sheet to obtain a decorative sheet suitable for pressing.

Optionally, a hard mineral of fine particle size in a concentration sufficient to provide abrasion resistant layer without interfering with visibility may be added to the coating mixture. The hard mineral that may be used in the coating composition is of fine particle size, preferably between about 1-200 microns, and used in quantities sufficient to provide an abrasion resistant layer without interfering with visibility. The hard mineral is preferably alumina, silica, zirconium oxide, cerium oxide, glass beads, and diamond dust or mixtures thereof. When using a hard mineral in the coating mixture, a binding material or suspending agent for such mineral may be necessary. The binder material or suspending agent should have the properties of being able to withstand the subsequent laminating conditions and wherein said binding material or suspending agent is compatible with the impregnating resin. Such binding material or suspending agent is used in an amount sufficient to bind the abrasion resistant mineral to the surface of the decor sheet.

The dissimilar resins may be either in liquid or particulate form. The coating resin that must melt and flow under heat and pressure in (a) above are selected from the group consisting of polyester, polyurethane, epoxy, polyvinyl chloride, and acrylic, or mixtures thereof. It is understood by the expression "melt and flow" that man liquid materials need no further melting in order to flow sufficiently. In order to achieve the brilliant visual pearlescent effect, it is important that the coating resin be a resin having a refractive index in the finished cured laminate dissimilar from the refractive index of the pearlescent ink on the decorative facing sheet being used.

The binding material or suspending agent is preferably a mixture of micro-crystalline cellulose with a minor amount of carboxy methyl cellulose; "AVICEL" is sold as a mixture of approximately 89% micro-crystalline cellulose and 11% carboxy methyl cellulose. The coating composition suitably contains 1-8 parts by weight of "AVICEL" to 4-32 parts by weight of the combination of the mineral particles and polymer particulates preferably at a ratio of mineral particles to binding material or suspending agent of 4:1 to 1:2, and a quantity of 1 part of "AVICEL" per 2 parts of mineral particles has been found to be particularly suitable. It is also possible to add small additional quantities of carboxy methyl cellulose (or none whatsoever) and a small quantity of silane. It is preferable to include a small quantity of surfactant, as disclosed in U.S. Pat. No. 4,255,480, and a small quantity of solid lubricant to provide scuff resistant, as disclosed in U.S. Pat. No. 4,567,087.

There are six important variables in the formulation, three of which are independent and three of which are dependent. The data presented in Table 1, below, helps define the parameters. Decor paper weight, resin content and weight of the abrasion resistant composition are all independent of the formulation. The requirements for these variables are set by outside factors such as color, degree of final saturation, and abrasion resistance. Resin weight (dry) per ream is dependent on a combination of paper basis weight and resin content. Viscosity is dependent on the total volume of liquid versus the content of abrasion-resistant composition. For complete saturation of the decor paper a the coater, the mixture viscosity should be less than 200 centipoise for porous paper, preferably in the range of 50-100 centipoise depending on paper porosity.

TABLE I

Coating Variable Comparison
For Coated/Saturated Decor Papers

|  | 65 lb. Solid | 80 lb. Solid | 65 lb. Printed |
|---|---|---|---|
| Total % Add On (resin content) | 52% | 52% | 52% |
| Volatile Content (approximate) | 6% | 6% | 6% |
| Primary Resin (melamine) | 61 lbs. | 75 lbs. | 61 lbs. |
| Secondary Resin (polyester) | 2 lbs. | 2 lbs. | 2 lbs. |
| Suspending Agent (Avicel) | 0.7 lbs. | 0.7 lbs. | 1.7 lbs. |
| Mold Release (Infernol) | 0.01 lbs. | 0.02 lbs. | 0.01 lbs. |
| Anti Foam Surfactant | 0.04 lbs. | 0.05 lbs. | 0.04 lbs. |
| Catalyst (Naccure) | 0.09 lbs. | 0.11 lbs. | 0.09 lbs. |
| Abrasion Resistant Mineral ($Al_2O_3$) | 2.00 lbs. | 2.00 lbs. | 5.00 lbs. |
| Total Coat Weight per 3000 sq. ft. | 65.21 lbs. | 78.08 lbs. | 69.54 lbs. |
| Viscosity of formula required for good saturation | 50-100 cps | 80-100 cps | 50-100 cps |
| Approximate viscosity prior to addition of water | 400 cps | 300 cps | 1800 cps |
| Approximate water added to Reduce to 50-100 cps | 75 lbs. | 60 lbs. | 90 lbs. |

From Table I above, it will be noted that the heavier the basis weight of decor paper, the greater is the volume of liquid resin required. This yields a corresponding lower final viscosity on the 80 pound paper coating as compared to the 65 pounds paper coating.

The preferred embodiment of the present invention uses finely ground particulates of polyester resin applied at a rate about two pounds per ream of decorative laminate facing sheet. Either thermoplastic or thermoset resins may be used and the selection of which, depends on the final physical or chemical properties desired. Other embodiments include the use of polymer particulates made from polyurethane, epoxy, polyvinyl chloride, and acrylic resins, or mixtures thereof in a melamine or a polyester resin. It is also possible to apply the coating resin in an amount as low as one pound per ream and as high as ten pounds per ream of decorative laminate facing sheet.

The following examples are offered illustratively:

EXAMPLE I

This example illustrates one method and composition that achieves a pearlescent appearance on a laminate surface. Warm 150 gal. melamine resin at 100° F.±5° F. is placed in a container under a low shear mixer. The melamine having a density of 1.15 and 37.7% solids. TRITON CF21 surfactant is an amount of 0.001 part by weight are added per 192.8 lbs. of liquid resin. Mixing is continued at a high speed for 5 minutes. 9.86 lbs of AVICEL and 0.87 lbs Emerest 2652 (anti-foam) as rapidly added in a manner as to avoid clumping or the formation of lumps. Immediately thereafter 38.76 lbs of polyester particulates made from the Morton 23-9036 and 24.66 lbs of 4μ alumina are added rapidly and completed in less than three minutes.

The viscosity is measured and 70 gal. of water is added to provide a viscosity of no greater than 150 centipoise (Brookfield viscometer #3, spindle at 12 rpm).

Printed decor paper weighing 65 lbs/ream is coated at the rate of 196.1 lbs/ream. This gives an approximate 2 lbs/ream coating of the polyester resin. A ream of paper in the present field is 3,000 ft$^2$. The paper is dried at an elevated temperature and is ready for use in the manufacture of laminates. The laminate was prepared in the usual practice.

EXAMPLES II, III, IV and V

Example I was followed above using 35.2 lbs of Glidden 2C-114 (epoxy), 4C-104 (acrylic), 5C-104 (polyester) and Morton Polyester 23-9036 in the following mixtures:

|  | Batch Formulations | | | |
|---|---|---|---|---|
|  | A | B | C | D |
| Melamine resin (liquid) 63% solids | 150 gal. | 150 gal. | 150 gal. | 150 gal. |
| Water | 70 gal. | 70 gal. | 70 gal. | 70 gal. |
| Emerest 2652 Surfactant | 3.5 lbs. | 3.5 lbs. | 3.5 lbs. | 3.5 lbs. |
| Avicel | 11.0 lbs. | 11.0 lbs. | 11.0 lbs. | 11.0 lbs. |
| Aluminum oxide, 40 micron | 70.5 lbs. | 70.5 lbs. | 70.5 lbs. | 70.5 lbs. |
| Mold release (Infernol) | 1 lbs. | 1 lbs. | 1 lbs. | 1 lbs. |
| Morton polyester 23-9036 | 35.2 lbs. | — | — | — |
| Glidden polyester 5C-104 | — | 35.2 lbs. | — | — |
| Glidden acrylic 4C-104 | — | — | 35.2 lbs. | — |
| Glidden epoxy 2C-114 | — | — | — | 35.2 lbs. |

The following table illustrates by comparison how well the present invention achieves the international standards for horizontal laminate surfaces while retaining brilliant visual effects.

| | | Pearlescent Printed Paper Typical Values | | |
|---|---|---|---|---|
| NEMA Test Methods | NEMA Standard | No Overlay | With Overlay | Composition A |
| Wear value | 400 cycles/min. | 25 c/m | 450 c/m | 825 c/m |
| High-temp resistance | Slight | NE | NE | NE |
| Hot water | NE* | NE | NE | NE |

| NEMA Test Methods | NEMA Standard | Pearlescent Printed Paper Typical Values | | |
|---|---|---|---|---|
| | | No Overlay | With Overlay | Composition A |
| Dimensional change | .5 MD/.9 CD | .06/.69 | .06/.69 | .06/.69 |
| Impact | 50 in. min. | 66 in. | 66 in. | 66 in. |
| Conductive heat | NE | NE | NE | NE |
| Cigarette resistance | 125 min. | 220 min. | 220 min. | 220 min. |
| Light Stability | Slight | NE | NE | NE |
| Stain | NE: 1-23/Mod: 24-29 | NE | NE | NE |
| Scuff resistance | NE | Severe | NE | NE |
| Visual appearance | — | Bright-Excellent Pearlescent appearance | Dull-No Visual Bright | Bright-Excellent Pearlescent appearance |

*NE = No effect
"No Overlay" is a melamine surface alone.
"With Overlay" is a standard construction of an alpha-cellulose paper impregnated with melamine on the surface of the laminate.

This comparative test illustrates the advantages of the present invention. The pearlescent printed paper without a protective overlay has a desirable appearance but lacks required durability. The standard construction with an overlay has desirable durability but lacks the brilliant pearlescent appearance.

It is only with the present invention, Composition A, that both the desired durability characteristics is achieved in a laminate having a brilliant pearlescent appearance.

EXAMPLE VI

The following coating surface dispersion formula is used in the two step laminate process wherein a surface coating dispersion is applied to the exterior surface of the facing sheet which has been applied into the exterior side of the backing layer. After each decorative sheet was coated with the surface coating mixture, the coated decorative sheet was dried in the usual manner whereupon the coated decorative sheet was saturated with melamine thermosetting resin and pressed to form the laminate.

| Coating Surface Batch Formulation | |
|---|---|
| Cold Water | 417 grams |
| CMC-7M | 2.5 grams |
| AVICEL | 7.5 grams |
| Alumina particulates, 20 microns | 30 grams |

| Coating Surface Batch Formulation | |
|---|---|
| Morton Polyester 23-9036 | 30 grams |
| Ultraviolet tracer PWA @ 100% | 0.28 grams |
| Acetic Acid @ 5.6% | 0.95 grams |
| Formaldehyde @ 37% | 0.28 grams |

| Woodgrain-1 | US20* | US40* |
|---|---|---|
| Initial Point | 50 | 50 |
| Final Point | 175 | 350 |
| Wear Vaue | 173 | 200 |
| Woodgrain-2 | | |
| Initial Point | 125 | 50 |
| Final Point | 200 | 275 |
| Wear Value | 163 | 163 |
| Woodgrain-3 | US80* (14.3 lb/ream) | US90* (15.5 lb/ream) |
| Initial Point | 100 | 125 |
| Final Point | 500 | 525 |
| Wear Value | 300 | 325 |
| Rate of Wear | 0.036 grams | 0.037 grams |

*Mayer Bar Coating Technique. It is understood by those skilled in the art that this is a technique to vary coating weight.

EXAMPLES VII-XIII

Additional coating surface mixture formulas are possible. Using the method as explained in Example I, above, the components may be mixed as follows:

| | | | 65 lb/ream paper | | | |
|---|---|---|---|---|---|---|
| | Impregnating Resin | Polymer Particulate | Surfactant | Antifoam | Mineral Particulate | Diluent |
| VII. | Polyester 61 lbs. (dry) | Epoxy 2 lbs. (dry) | 0.01 lbs. | 0.04 lbs. | 5.0 lbs. | as required |
| VIII. | Polyester 61 lbs. (dry) | PVC 2 lbs. (dry) | 0.01 lbs. | 0.04 lbs. | 5.0 lbs. | as required |
| IX. | Polyester 61 lbs. (dry) | Acrylic 2 lbs. (dry) | 0.01 lbs. | 0.04 lbs. | 5.0 lbs. | as required |
| X. | Acrylic 61 lbs. (dry) | Polyurethane 2 lbs. (dry) | 0.01 lbs. | 0.04 lbs. | 5.0 lbs. | as required |
| XI. | Polyester 61 lbs. (liquid @ 100% solids) | Polyester 2 lbs. (dry) | 0.01 lbs. | 0.04 lbs. | 5.0 lbs. | as required |
| XII. | Melamine | Polyester | 0.01 lbs. | 0.04 lbs. | 5.0 lbs. | as |

-continued

| | Impregnating Resin | Polymer Particulate | 65 lb/ream paper Sur-factant | Anti-foam | Mineral Particulate | Diluent |
|---|---|---|---|---|---|---|
| XIII. | 61 lbs. (dry) Melamine 61 lbs. (dry) | 1 lb. (dry) Polyester 10 lbs. (dry) | 0.01 lbs. | 0.04 lbs. | 5.0 lbs. | required as required |

What is claimed is:

1. A decorative laminate comprising:
   a paper core backing layer;
   a decorative paper facing sheet having a first exterior surface laminated to said backing layer; and
   a coating including at least two dissimilar resins applied prior to laminating said facing sheet to said backing layer on a second exterior surface of said decorative facing sheet, one of said resins being a liquid melamine impregnating resin and another of said resins being a surface coating resin that melts and flows under heat and pressure during lamination to form a laminating surface having one or more of the following properties including enhanced wearability, chemical, thermal, ultra-violet radiation resistance or abrasion resistance.

2. A decorative laminate in accordance with claim 1, wherein said surface coating resin is selected from the group consisting essentially of polyester, polyurethane, epoxy, polyvinyl chloride, acrylic, and mixtures of two or more of the foregoing.

3. A laminate in accordance with claim 1, wherein said coating surface includes a mixture of an abrasion resistant hard mineral having a particle size of between about 1-200 microns in a concentration sufficient to provide abrasion resistance without interfering with visibility.

4. A laminate in accordance with claim 1, wherein said abrasion resistant mineral particles are selected from the group consisting of alumina, silica, zirconium oxide, cerium oxide, glass beads, diamond dust and mixtures of two or more of the foregoing.

5. A laminate in accordance with claim 3, wherein said abrasion resistant mineral is alumina and wherein said alumina is chemically bound to said melamine with a silane.

6. A decorative laminate comprising:
   a paper core backing layer;
   a decorative paper facing sheet having a first exterior surface laminated to said backing layer and having a pearlescent ink on a second exterior surface; and
   a coating including at least two dissimilar resins applied prior to laminating said facing sheet to said backing layer on the second exterior surface of said decorative facing sheet, one of said resins being a liquid melamine impregnating resin and another of said resins being a surface coating resin that melts and flows under heat and pressure during lamination and which has a refractive index in the cured laminate dissimilar from the refractive index of the pearlescent ink on the decorative facing sheet to form a laminate having a pearlescent appearance.

7. A decorative laminate in accordance with claim 6, wherein the surfacing coating resin is a polymer which melts and flows under heat and pressure selected from the group consisting essentially of polyester, polyurethane, epoxy, polyvinyl chloride, acrylic and mixtures of two or more of the foregoing.

8. A laminate in accordance with claim 6, wherein said coating further includes a mixture of an abrasion resistant hard mineral having a particle size of between about 1-200 microns in a concentration sufficient to provide abrasion resistance without interfering with visibility.

9. A laminate in accordance with claim 6, wherein said abrasion resistant mineral particles are selected from the group consisting of alumina, silica, zirconium oxide, cerium oxide, glass beads, diamond dust and mixtures of two or more of the foregoing.

10. A laminate in accordance with claim 8, wherein said abrasion resistant mineral is alumina and wherein said alumina is chemically bound to said melamine with a silane.

* * * * *